United States Patent
Seo et al.

(10) Patent No.: US 10,492,219 B2
(45) Date of Patent: Nov. 26, 2019

(54) METHOD FOR TRANSMITTING AND RECEIVING SIGNAL FOR DEVICE-TO-DEVICE COMMUNICATION IN WIRELESS COMMUNICATION SYSTEM AND DEVICE THEREFOR

(71) Applicant: LG ELECTRONICS INC., Seoul (KR)

(72) Inventors: Hanbyul Seo, Seoul (KR); Hakseong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 118 days.

(21) Appl. No.: 15/300,647

(22) PCT Filed: Mar. 30, 2015

(86) PCT No.: PCT/KR2015/003100
§ 371 (c)(1),
(2) Date: Sep. 29, 2016

(87) PCT Pub. No.: WO2015/152583
PCT Pub. Date: Oct. 8, 2015

(65) Prior Publication Data
US 2017/0181186 A1 Jun. 22, 2017

Related U.S. Application Data

(60) Provisional application No. 61/972,387, filed on Mar. 30, 2014, provisional application No. 61/982,309, filed on Apr. 21, 2014.

(51) Int. Cl.
*H04W 72/14* (2009.01)
*H04W 72/04* (2009.01)
(Continued)

(52) U.S. Cl.
CPC ......... *H04W 72/14* (2013.01); *H04W 72/042* (2013.01); *H04W 72/1278* (2013.01); *H04W 92/18* (2013.01)

(58) Field of Classification Search
CPC ... H04W 72/14; H04W 72/042; H04W 92/18; H04W 72/1278
See application file for complete search history.

(56) References Cited

U.S. PATENT DOCUMENTS

2012/0106517 A1* 5/2012 Charbit ................ H04W 72/04
370/336
2013/0155962 A1 6/2013 Hakola et al.
(Continued)

FOREIGN PATENT DOCUMENTS

CN 103209487 A 7/2013
CN 103249007 A * 8/2013
(Continued)

OTHER PUBLICATIONS

Panteleev et al. "Method for Resource for D2D Operation Within Network Coverage", Mar. 20, 2014, U.S. Appl. No. 61/968,286, pp. 9 (filed 2014).*

(Continued)

*Primary Examiner* — Un C Cho
*Assistant Examiner* — Shah M Rahman
(74) *Attorney, Agent, or Firm* — Birch, Stewart, Kolasch & Birch, LLP

(57) ABSTRACT

The present invention provides a method for transmitting and receiving a signal for D2D communication and a device therefor, which are used in a wireless access system that supports D2D communication. The method by which a terminal transmits and receives a signal for D2D communication, according to one embodiment of the present invention, can comprise the steps of: receiving a D2D data grant (Continued)

which includes information for transmitting and receiving D2D data from a base station; receiving, from the base station, a scheduling allocation grant which designates a resource for transmitting D2D scheduling allocation information; and transmitting the D2D scheduling allocation information and/or the D2D data to a specific D2D receiving terminal among a plurality of D2D receiving terminals. In this case, the specific D2D receiving terminal can be determined on the basis of the scheduling allocation grant and/or the D2D data grant.

3 Claims, 10 Drawing Sheets

(51) Int. Cl.
*H04W 72/12* (2009.01)
*H04W 92/18* (2009.01)

(56) References Cited

U.S. PATENT DOCUMENTS

| | | | |
|---|---|---|---|
| 2013/0157676 A1* | 6/2013 | Baek | H04W 72/0486 |
| | | | 455/452.1 |
| 2013/0201954 A1* | 8/2013 | Gao | H04W 72/0413 |
| | | | 370/329 |
| 2013/0225191 A1* | 8/2013 | Hunt | H04L 5/0041 |
| | | | 455/452.1 |
| 2013/0322413 A1 | 12/2013 | Pelletier et al. | |
| 2014/0036718 A1* | 2/2014 | Gao | H04W 72/121 |
| | | | 370/254 |
| 2014/0177564 A1* | 6/2014 | Ma | H04W 74/04 |
| | | | 370/329 |
| 2015/0049732 A1* | 2/2015 | Xue | H04L 1/1854 |
| | | | 370/330 |
| 2015/0085818 A1* | 3/2015 | Huang | H04L 5/0037 |
| | | | 370/330 |
| 2015/0092706 A1* | 4/2015 | Chen | H04W 74/02 |
| | | | 370/329 |
| 2015/0208401 A1* | 7/2015 | Lu | H04W 76/14 |
| | | | 455/452.1 |
| 2015/0249981 A1* | 9/2015 | Wu | H04W 24/10 |
| | | | 370/329 |
| 2015/0271800 A1* | 9/2015 | Panteleev | H04W 72/042 |
| | | | 370/329 |
| 2015/0271807 A1* | 9/2015 | Patil | H04W 76/14 |
| | | | 455/426.1 |
| 2016/0037547 A1* | 2/2016 | Yang | H04W 4/70 |
| | | | 370/329 |
| 2016/0174278 A1* | 6/2016 | Gao | H04W 72/085 |
| | | | 370/329 |
| 2017/0171837 A1* | 6/2017 | Chen | H04W 72/04 |

FOREIGN PATENT DOCUMENTS

| | | |
|---|---|---|
| CN | 103428679 A | 12/2013 |
| WO | WO 2012/071689 A1 | 6/2012 |
| WO | WO 2013/026359 A1 | 2/2013 |
| WO | WO 2014/022769 A1 | 2/2014 |

OTHER PUBLICATIONS

Ericsson, "Frame Structure for D2D-Enabled LTE Carriers," 3GPP TSG RAN WG1 Meeting #76, Prague, Czech Republic, R1-140775, Feb. 10-14, 2014, 3 pages.

Ericsson, "On Scrambling of D2D Physical Channels," 3GPP TSG RAN WG1 Meeting #76, Prague, CZ Rep., R1-140777, Feb. 10-14, 2014, 5 pages.

Ericsson, "Overview of D2D functions and standardization impact," 3GPP TSG RAN WG1 Meeting #76, Prague, Czech Republic, R1-140771, Feb. 10-14, 2014, pp. 1-7.

Qualcomm Incorporated, "eNB Resource Allocation for D2D Broadcast Communication," 3GPP TSG-RAN WG1 #76BIS, Shenzhen, China, R1-141451, Mar. 31-Apr. 4, 2014, pp. 1-6.

* cited by examiner

FIG. 2
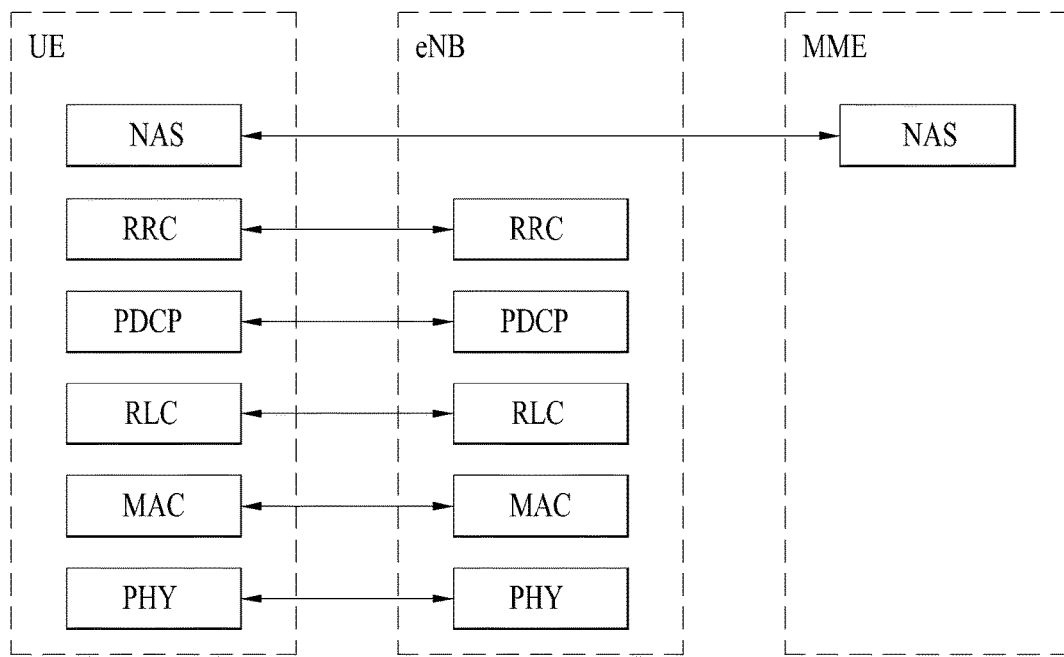
(a) Control-plane protocol stack
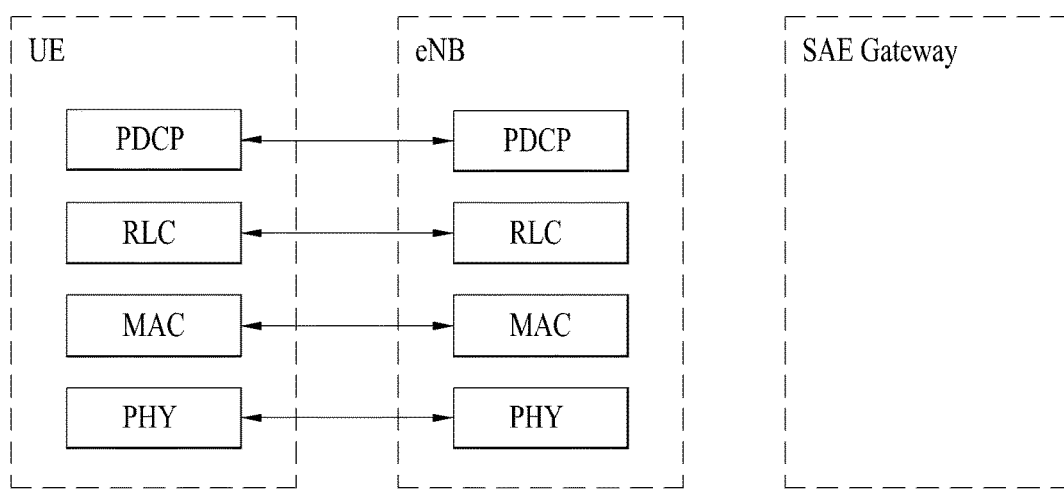
(b) User-plane protocol stack

METHOD FOR TRANSMITTING AND RECEIVING SIGNAL FOR DEVICE-TO-DEVICE COMMUNICATION IN WIRELESS COMMUNICATION SYSTEM AND DEVICE THEREFOR

CROSS REFERENCE TO RELATED APPLICATIONS

This application is the National Phase of PCT/KR2015/003100 filed on Mar. 30, 2015, which claims priority under 35 U.S.C. § 119(e) to U.S. Provisional Application Nos. 61/972,387 filed on Mar. 30, 2014; and 61/982,309 filed on Apr. 21, 2014, all of which are hereby expressly incorporated by reference into the present application.

TECHNICAL FIELD

The present invention relates to a wireless communication system. More particularly, the present invention relates to a method of transmitting and receiving a signal for device-to-device communication in a wireless communication system and an apparatus therefor.

BACKGROUND ART

3GPP LTE (3rd generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE OF THE INVENTION

Technical Task

An object of the present invention is to provide a method of transmitting and receiving a signal for device-to-device communication in a wireless communication system and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

TECHNICAL SOLUTION

The present invention is used for a wireless access system supporting D2D (device to device) communication. The present invention provides a method of transmitting and receiving a signal for the D2D communication and an apparatus therefor.

To achieve these and other advantages and in accordance with the purpose of the present invention, as embodied and broadly described, according to one embodiment, a method of transmitting and receiving a signal, which is transmitted and received by a user equipment for D2D (device-to-device) communication in a wireless communication system), includes the steps of receiving a D2D data grant including information for transmitting and receiving D2D data from a base station, receiving a scheduling allocation grant from the base station to designate a resource for transmitting D2D scheduling allocation information, and transmitting at least one of the D2D scheduling allocation information and the D2D data to a specific D2D reception UE among a plurality of D2D reception UEs. In this case, the specific D2D reception UE can be determined based on at least one of the scheduling allocation grant and the D2D data grant.

And, the method can further include the step of receiving information on a subframe set interlocked with the specific D2D reception UE from the base station.

To further achieve these and other advantages and in accordance with the purpose of the present invention, according to a different embodiment, a method of transmitting and receiving a signal, which is transmitted and received by a base station for D2D (device-to-device) communication in a wireless communication system), includes the steps of transmitting a D2D data grant including information for transmitting and receiving D2D data to a D2D transmission UE and transmitting a scheduling allocation grant to the D2D transmission UE to designate a resource for transmitting D2D scheduling allocation information. In this case, the information for transmitting and receiving the D2D data may correspond to information for transmitting and receiving data between the D2D transmission UE and a specific D2D reception UE among a plurality of D2D reception UEs and the specific D2D reception UE can be determined based on at least one of the scheduling allocation grant and the D2D data grant.

And, the method can further include the step of transmitting information on a subframe set interlocked with the specific D2D reception UE to the D2D reception UE.

To further achieve these and other advantages and in accordance with the purpose of the present invention, according to a further different embodiment, a user equipment transmitting and receiving a signal for D2D (device-to-device) communication in a wireless communication system can include a transceiving module configured to receive a D2D data grant including information for transmitting and receiving D2D data from a base station, the transceiving module configured to receive a scheduling allocation grant from the base station to designate a resource for transmitting D2D scheduling allocation information, the transceiving module configured to transmit at least one of the D2D scheduling allocation information and the D2D data to a specific D2D reception UE among a plurality of D2D reception UEs, and a processor configured to support the D2D communication. In this case, the specific D2D reception UE can be determined based on at least one of the scheduling allocation grant and the D2D data grant.

To further achieve these and other advantages and in accordance with the purpose of the present invention, according to a further different embodiment, a base station transmitting and receiving a signal for D2D (device-to-device) communication in a wireless communication system) can include a transceiving module configured to transmit a D2D data grant including information for transmitting and receiving D2D data to a D2D transmission UE, the transceiving module configured to transmit a scheduling allocation grant to the D2D transmission UE to designate a resource for transmitting D2D scheduling allocation information, and a processor. In this case, the information for transmitting and receiving the D2D data may correspond to information for transmitting and receiving data between the D2D transmission UE and a specific D2D reception UE among a plurality of D2D reception UEs and the specific D2D reception UE can be determined based on at least one of the scheduling allocation grant and the D2D data grant.

Following items can be commonly applied to the present invention.

The specific D2D reception UE can be determined based on a location of a subframe in which at least one of the scheduling allocation grant and the D2D data grant is transmitted.

Preferably, if the location of the subframe belongs to the subframe set, the scheduling allocation grant or the D2D data grant may correspond to a grant for the specific D2D reception UE.

Or, the specific D2D reception UE can be determined based on a value corresponding to the remainder resulted from dividing indexes of subframes in which at least one of the scheduling allocation grant and the D2D data grant is transmitted by the number of a plurality of the D2D reception UEs.

Meanwhile, the information for transmitting and receiving the D2D data can be transmitted to the specific D2D reception UE in a manner of being included in the D2D scheduling allocation information.

A specific field included in the D2D data grant can be interlocked with a specific field included in the scheduling allocation grant.

The aforementioned embodiments of the present invention are just a part of preferred embodiments of the present invention. Various embodiments to which technical characteristics of the present invention are reflected can be deducted and understood by those skilled in the art based on the detailed explanation of the present invention described in the following.

Advantageous Effects

According to the present invention, it is able to efficiently transmit and receive a signal for D2D (device-to-device) communication in a wireless communication.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 2 is a diagram for structures of control and user planes of radio interface protocol between a 3GPP radio access network standard-based user equipment and E-UTRAN;

BEST MODE

Mode for Invention

Figure 1:
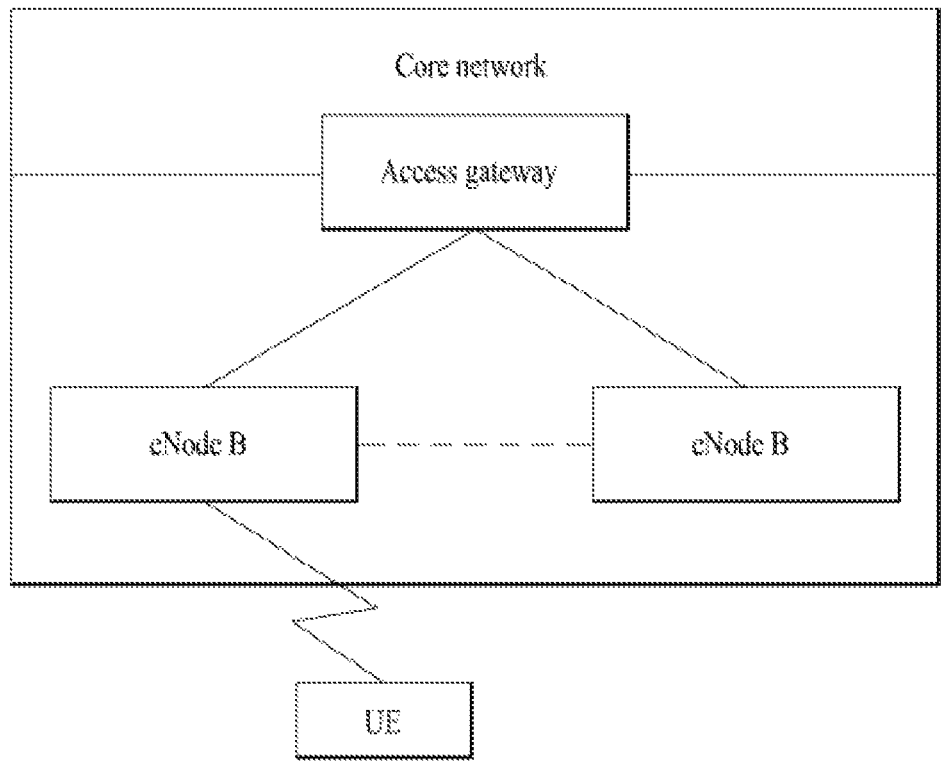
FIG. 1 is a diagram of E-UMTS network structure as one example of a wireless communication system.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. The CDMA may be embodied with wireless (or radio) technology such as UTRA (Universal Terrestrial Radio Access) or CDMA2000. The TDMA may be embodied with wireless (or radio) technology such as GSM (Global System for Mobile communications)/GPRS (General Packet Radio Service)/EDGE (Enhanced Data Rates for GSM Evolution). The OFDMA may be embodied with wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). The UTRA is a part of the UMTS (Universal Mobile Telecommunications System). The 3GPP (3rd Generation Partnership Project) LTE (long term evolution) is a part of the E-UMTS (Evolved UMTS), which uses E-UTRA. The 3GPP LTE employs the OFDMA in downlink and employs the SC-FDMA in uplink. The LTE-Advanced (LTE-A) is an evolved version of the 3GPP LTE. WiMAX can be explained by an IEEE 802.16e (WirelessMAN-OFDMA Reference System) and an advanced IEEE 802.16m (WirelessMAN-OFDMA Advanced System).

For clarity, the following description focuses on the 3GPP LTE and 3GPP LTE-A system. However, technical features of the present invention are not limited thereto.

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a 1st layer, provides higher layers with an information transfer service using a physical channel. The physical layer is connected to a medium access control layer situated above via a transport channel (trans antenna port channel). Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a 2nd layer provides a service to a radio link control (hereinafter abbreviated RLC) layer, which is a higher layer, on a logical channel. The RLC layer of the 2nd layer supports a reliable data transmission. The function of the RLC layer may be implemented by a function block within the MAC. PDCP (packet data convergence protocol) layer of the 2nd layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a 3rd layer is defined on a control plane only. The RRC layer is responsible for control of logical channels, transport channels and physical channels in association with a configuration, a re-configuration and a release of radio bearers (hereinafter abbreviated RBs). The RB indicates a service provided by the 2nd layer for a data delivery between the user equipment and the network. To this end, the RRC layer of the user equipment and the RRC layer of the network exchange a RRC message with each other. In case that there is an RRC connection (RRC connected) between the user equipment and the RRC layer of the network, the user equipment lies in the state of RRC connected (connected mode). Otherwise, the user equipment lies in the state of RRC idle (idle mode). A non-access stratum (NAS) layer situated at the top of the RRC layer performs such a function as a session management, a mobility management and the like.

A single cell consisting of an eNode B (eNB) is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel). Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 3:
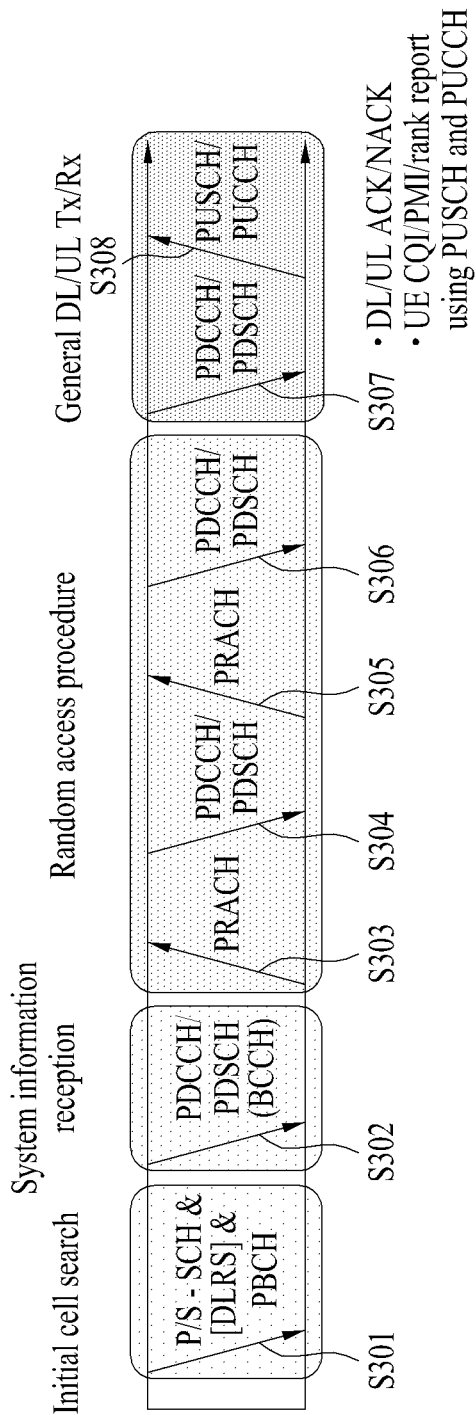
FIG. 3 is a diagram for explaining physical channels used for 3GPP LTE system and a general signal transmission method using the physical channels.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain a detailed system information [S302].

Meanwhile, if a user equipment initially accesses an eNode B or does not have a radio resource for transmitting a signal, the user equipment may be able to perform a random access procedure to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose. Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 4:
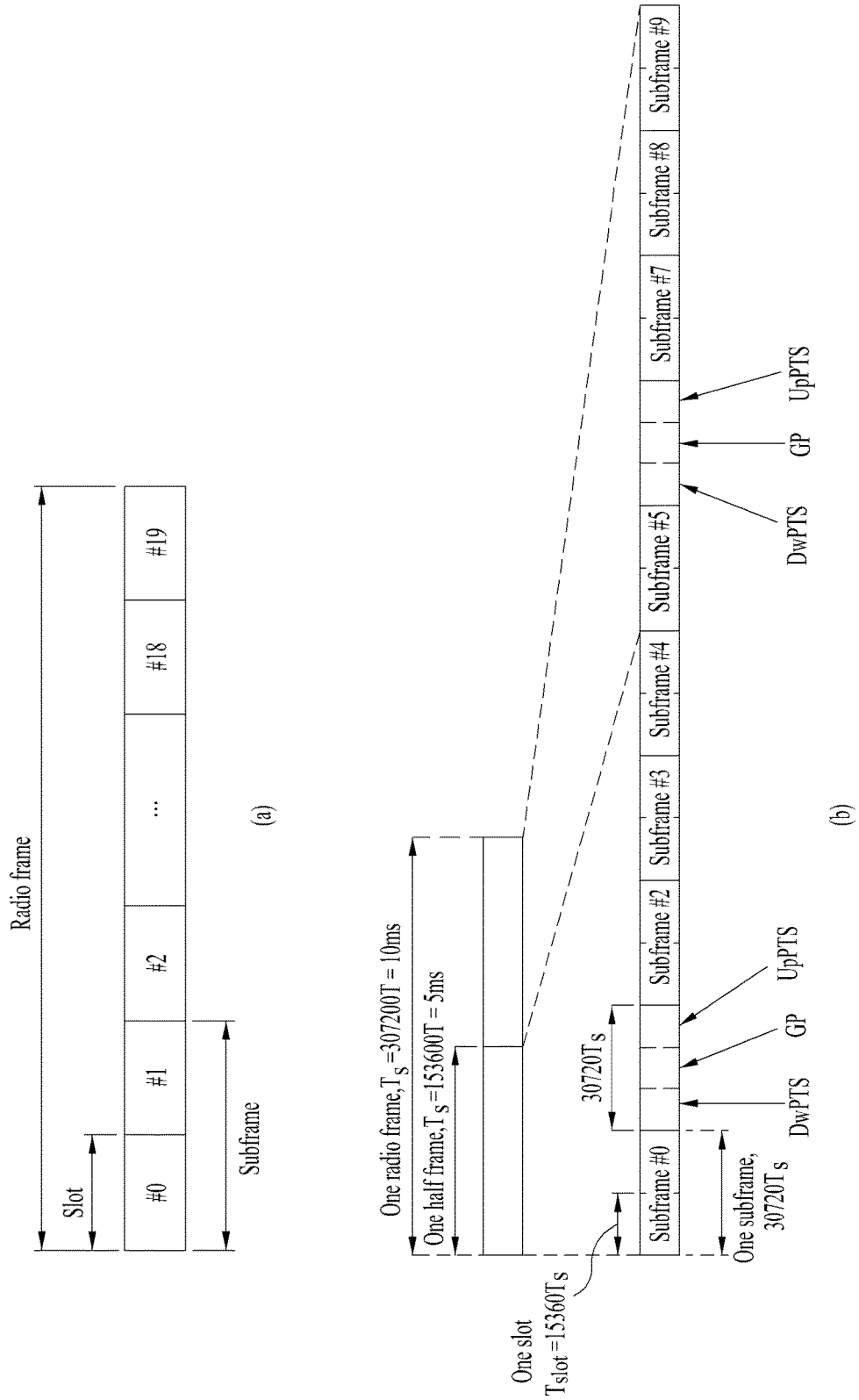
FIG. 4 is a diagram for a structure of a radio frame in LTE system.

The structure of a radio frame of 3GPP LTE system will be described with reference to FIG. 4.

In a cellular Orthogonal Frequency Division Multiplexing (OFDM) radio packet communication system, uplink/downlink data packets are transmitted in subframes. One subframe is defined as a predetermined time interval including a plurality of OFDM symbols. The 3GPP LTE standard supports a type 1 radio frame structure applicable to Frequency Division Duplex (FDD) and a type 2 radio frame structure applicable to Time Division Duplex (TDD).

FIG. 4(a) illustrates the type-1 radio frame structure. A downlink radio frame is divided into ten subframes. Each subframe includes two slots in the time domain. The time taken to transmit one subframe is defined as a transmission time interval (TTI). For example, a subframe may have a duration of 1 ms and one slot may have a duration of 0.5 ms. A slot may include a plurality of OFDM symbols in the time domain and includes a plurality of resource blocks (RBs) in the frequency domain. Since 3GPP LTE adopts OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol extends and thus the number of OFDM symbols included in a slot is smaller than in the case of the normal CP. For the extended CP, a slot may include, for example, 6 OFDM symbols. When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other three OFDM symbols may be allocated to a physical downlink shared channel (PDSCH).

FIG. 4(b) illustrates the type-2 radio frame structure. The type-2 radio frame includes two half frames, each of which has 5 subframes, a downlink pilot time slot (DwPTS), a guard period (GP), and an uplink pilot time slot (UpPTS). Each subframe includes two slots.

The DwPTS is used for initial cell search, synchronization, or channel estimation in a UE, whereas the UpPTS is used for channel estimation in an eNB and UL transmission synchronization in a UE. The GP is provided to eliminate interference taking place in UL due to multipath delay of a DL signal between DL and UL. Regardless of the type of a radio frame, a subframe of the radio frame includes two slots.

The current 3GPP standard document defines configuration of the special subframe as shown in Table 2 below. Table 2 shows DwPTS and UpPTS given when TS=1/(15000*2048), and the other region is configured as a GP.

TABLE 1

| Special subframe configuration | Normal cyclic prefix in downlink | | | Extended cyclic prefix in downlink | | |
|---|---|---|---|---|---|---|
| | DwPTS | UpPTS Normal cyclic prefix in uplink | UpPTS Extended cyclic prefix in uplink | DwPTS | UpPTS Normal cyclic prefix in uplink | UpPTS Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

In the LTE TDD system, uplink/downlink subframe configurations (UL/DL configurations) are given as shown in Table 1 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe, and S denotes the special subframe. Table 1 also shows downlink-to-uplink switch-point periodicity in uplink/downlink subframe configuration of each system.

The structure of the above radio frame is just example. The number of a subframe, the number of slot included in a subframe or the number of symbol included in a slot included in the radio frame can be changed.

Figure 5:
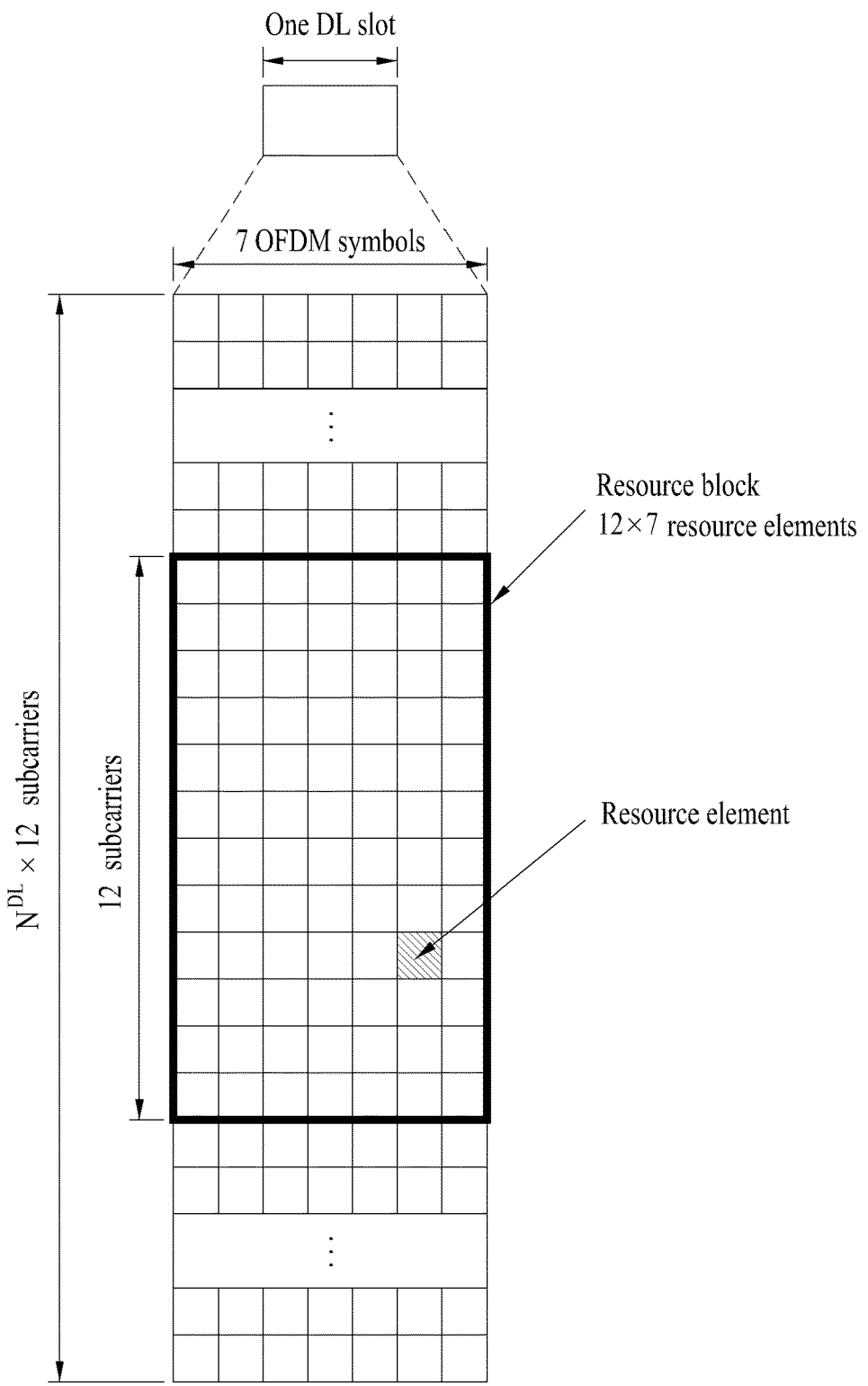
FIG. 5 is a diagram for a resource grid of a downlink slot.

FIG. 5 is a diagram illustrating a resource grid for a downlink slot.

Referring to FIG. 5, a DL slot includes $N_{symb}^{DL}$ OFDM symbols in the time domain and $N_{RB}^{DL}$ resource blocks in the frequency domain. Since each resource block includes $N_{sc}^{RB}$ subcarriers, the DL slot includes $N_{RB}^{DL} \times N_{sc}^{RB}$ subcarriers in the frequency domain. Although FIG. 5 illustrates that the DL slot includes seven OFDM symbols and the resource block includes twelve subcarriers, it is to be understood that the downlink slot and the resource block are not limited thereto. For example, the number of OFDM symbols included in the downlink slot may be varied depending on a length of CP (cyclic prefix).

Each element on the resource grid is referred to as a resource element (RE). One resource element is indicated by one OFDM symbol index and one subcarrier index. One RB includes $N_{symb}^{DL} \times N_{sc}^{RB}$ number of REs. The number $N_{RB}^{DL}$ of RBs included in the DL slot depends on a DL transmission bandwidth configured in a cell.

Figure 6:
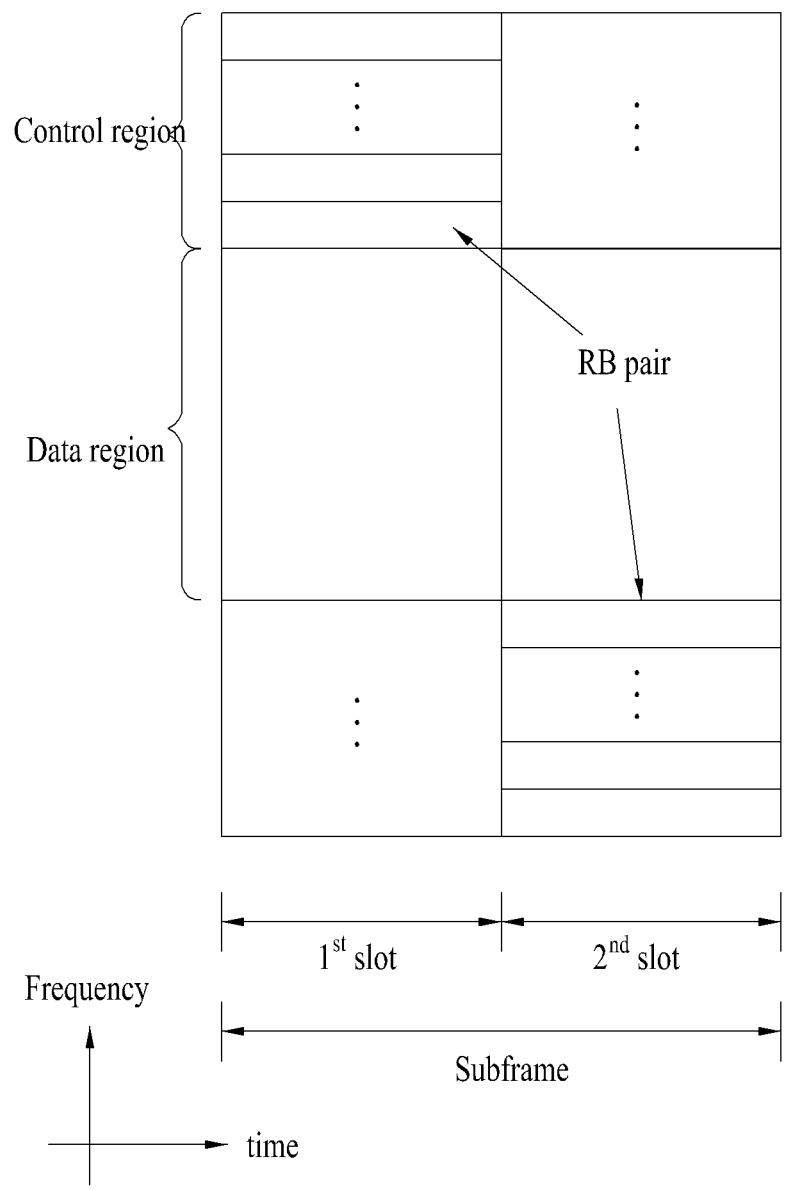
FIG. 6 is a diagram for an example of a structure of a downlink subframe.

FIG. 6 illustrates a structure of an uplink subframe applicable to embodiments of the present invention.

Referring to FIG. 6, a UL subframe may be divided into a control region and a data region in the frequency domain. A PUCCH for carrying uplink control information is allocated to the control region and a PUSCH for carrying user data is allocated to the data region. In the LTE system, a UE does not simultaneously transmit the PUCCH and the PUSCH to maintain a single carrier property. However, in the LTE-A system, a PUCCH signal and a PUSCH signal can be simultaneously transmitted due to the introduction of carrier aggregation technology. The PUCCH for one UE is allocated to an RB pair in a subframe. RBs belonging to the RB pair occupy different subcarriers in respective two slots. This is called that the RB pair allocated to the PUCCH is frequency-hopped in a slot boundary.

Figure 7:
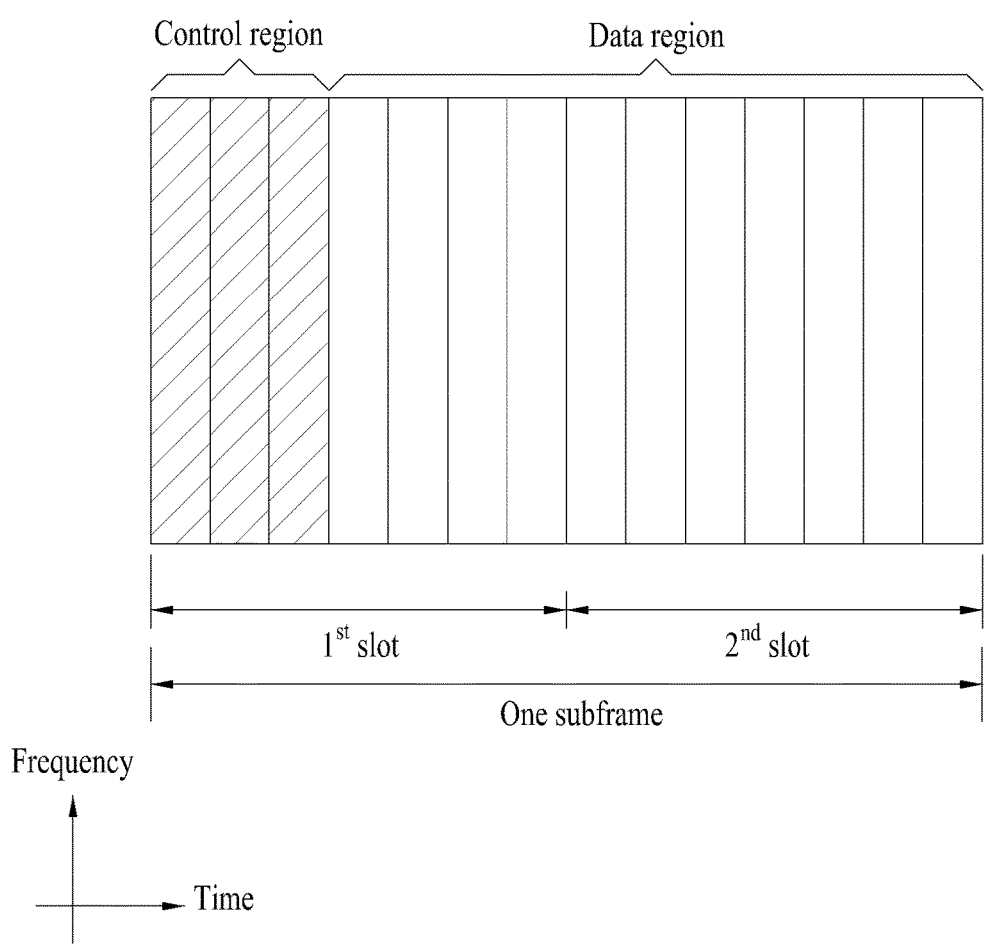
FIG. 7 is a diagram for a structure of an uplink subframe in LTE system.

FIG. 7 is a diagram illustrating a structure of a downlink subframe applicable to embodiments of the present invention.

Referring to FIG. 7, a maximum of three OFDM symbols from OFDM symbol index #0 of a first slot in a subframe correspond to a control region to be assigned with a control channel. The remaining OFDM symbols correspond to a data region to be assigned with a PDSCH. Examples of downlink control channels used in the 3GPP LTE system includes a physical control format indicator channel (PCFICH), a physical downlink control channel (PDCCH), a physical hybrid ARQ indicator channel (PHICH), etc.

The PCFICH is transmitted in a first OFDM symbol of a subframe and carries information on the number of OFDM symbols used for transmission of control channels (i.e. the size of the control region) in the subframe. The PHICH is a channel in response to UL transmission and carries ACK/NACK (acknowledgement/negative-acknowledgement) signal for HARQ (hybrid automatic repeat request). Control information transmitted through the PDCCH is called downlink control information (DCI). The DCI includes UL resource allocation information, DL resource allocation information, or UL transmit (TX) power control commands for a random UE group.

D2D (Device to Device) Communication

When D2D communication is introduced to the aforementioned wireless communication system (e.g., 3GPP LTE system or 3GPP LTE-A system), a method of performing the D2D communication is explained in detail in the following description.

In the following, D2D communication environment used in the present invention is briefly explained.

D2D (device to device) communication literally means communication between an electronic device and an electronic device. In a broad sense, the D2D communication means wired or wireless communication between electronic devices or communication between a device controlled by a human and a machine. Yet, recently, the D2D communication generally indicates wireless communication performed between an electronic device and an electronic device without human involvement.

Figure 8:
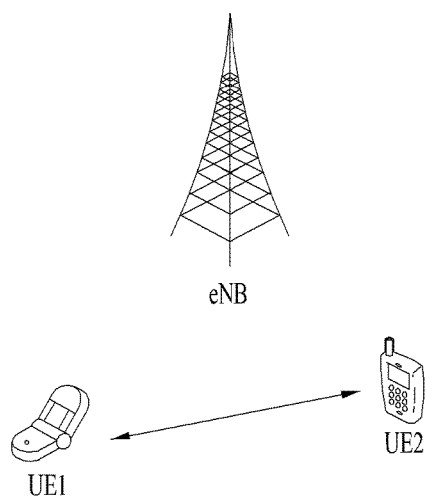
FIG. 8 is a diagram for an example of a communication system applicable to the present invention.

FIG. 8 is a diagram for conceptually explaining D2D communication. FIG. 8 shows a D2D (device-to-device) communication scheme or a UE-to-UE communication scheme as an example of the D2D communication. Data can be exchanged between UEs without passing through a base station. A link directly established between devices can be referred to as a D2D link. The D2D communication has merits in that latency is reduced compared to a legacy base station-centered communication scheme and a less radio resource is required, and the like. In this case, although a UE corresponds to a terminal of a user, if such a network device as an eNB transmits and receives a signal according to a communication scheme between UEs, the network device can be considered as a sort of UEs. In the following, a UE transmitting a D2D signal is referred to as a D2D transmission UE and a UE receiving a D2D signal is referred to as a D2D reception UE.

Although the D2D communication corresponds to a scheme supporting communication between devices (or UEs) without passing through a base station, since the D2D communication is performed by reusing a resource of a legacy wireless communication system (e.g., 3GPP LTE/LTE-A), it is necessary for the D2D communication not to cause interference or disturbance to the legacy wireless communication system. In the same context, it is also important to minimize interference that affects the D2D communication by a UE, a base station and the like operating in the legacy wireless communication system.

Figure 9:
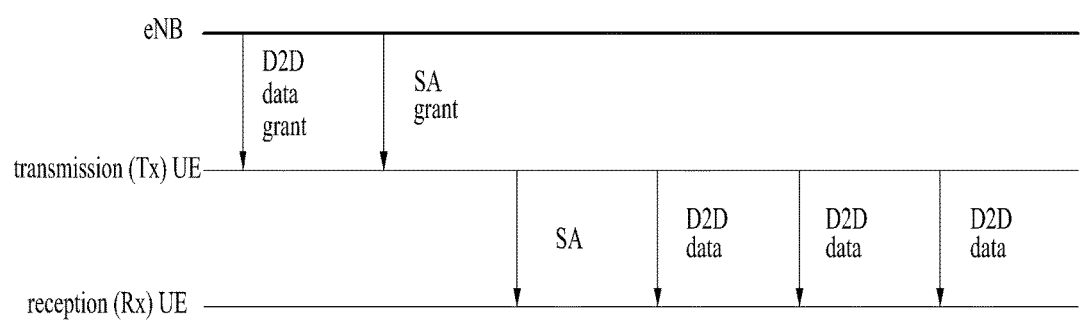
FIG. 9 is a diagram for explaining a structure of a signal applicable to the present invention.

Meanwhile, FIG. 9 is a diagram for explaining a signal structure of D2D communication applicable to the present invention. First of all, a D2D transmission UE can transmit a signal to a reception UE. The signal can include SA (scheduling assignment) and a D2D data. The SA and the D2D data can be transmitted and received in a manner of being separated from each other in time.

The SA includes information on a resource position of a D2D data to be transmitted or information necessary for a reception UE. The reception UE receives the SA and may be able to identify an attribute (e.g., a resource position of D2D data, and the like) of a signal transmitted by a transmission UE. If the SA is transmitted once, information on D2D data transmission to be performed once or several times in the future can be delivered.

An eNB can designate a resource used for the transmission UE to transmit the SA and a resource used for the transmission UE to transmit D2D data. To this end, the eNB can transmit PDCCH (or EPDCCH) of two types. One is an SA grant for designating the resource of the SA and another is a D2D data grant for designating the resource of the D2D data. According to the present invention, a grant can be included in PDCCH or EPDCCH. In the following, for clarity, assume that a grant is transmitted from the PDCCH, by which the present invention may be non-limited.

A remarkable aspect of the signal structure (or signaling structure) of the D2D communication is that at least information on a location of a resource transmitting D2D data among information received by a transmission UE via a D2D data grant should be delivered to the reception UE via the SA. Hence, referring to FIG. 9, an eNB preferentially transmits a D2D data grant and transmits an SA grant after prescribed time elapsed. Having received the SA grant from the eNB, the transmission UE delivers information on a D2D data transmission resource included in a D2D data grant to the reception UE via an SA resource designated by the SA grant. The transmission UE transmits D2D data using the D2D data transmission resource.

In order to smoothly operate the signal exchange system described in FIG. 9, it is necessary to correctly configure an interlocking relationship between grants to indicate whether or not an SA grant is interlocked with a D2D data grant. In the following, a method of configuring the interlocking relationship between the grants is explained.

Interlocking Between Grants

1) If a prescribed field is included in a D2D data grant and an SA grant and the field is configured by an identical value, it can be considered as the grants are interlocked with each other. In particular, if a specific field included in the D2D grant has an identical value, a UE, which has received the grant, identifies that the grants are interlocked with each other. In this case, the specific field can be named as a transaction ID. In particular, if the transaction ID is configured by a specific value in the D2D data grant, the transmission UE can deliver resource information of the D2D data grant to the reception UE using a resource designated by the SA grant including a transaction ID identical to the specific value.

2) Or, it may be able to configure the interlocking relationship between the grants by placing a prescribed time interval between the two grants. In particular, if a D2D data grant is transmitted in a subframe n, an SA grant interlocked with the D2D data grant is transmitted in a subframe n+k according to a predetermined k value. The k value can be fixed by such a specific value as 4 or may have a value equal to or greater than 4. Or, the k value can be given by such a condition as a first subframe in which the SA grant is transmittable. Or, the k value may have such a condition as a first subframe capable of transmitting the SA grant as a value equal to or greater than 4. Or, the k value can be designated based on a UL HARQ timeline of LTE. Specifically, if PUSCH is transmitted in a subframe n+a according to a UL grant received in a subframe n in a legacy UL HARQ and a retransmission grant is received in a subframe n+k in response to the PUSCH, the k value can be given as a parameter for interlocking the above-mentioned D2D data grant and the SA grant with each other.

Meanwhile, it is necessary to identify whether PDCCH (or EPDCCH) received by a UE corresponds to the SA grant or the D2D data grant. In the following, a method of separating the SA grant from the D2D data grant is proposed.

Separating SA Grant from D2D Data Grant

1) It may be able to separate grants from each other using a separation indicator. A separation indicator for separating an SA grant from a D2D data grant can be included in PDCCH (or EPDCCH). Hence, it is able to identify whether the grant corresponds to the SA grant or the D2D data grant using the separation indicator included in the PDCCH.

2) It may be able to identify a grant according to a location of a subframe in which PDCCH is transmitted. As an example, an eNB signals a subframe pattern in advance via such a higher layer signal as RRC and a subframe in which an SA grant is transmitted can be separated from a subframe in which a D2D data grant is transmitted using the subframe pattern. As a concrete example, the eNB transmits a bitmap corresponding to the subframe pattern. The eNB transmits the D2D data grant in a subframe which is configured by 0 in the bitmap and transmits the SA grant in a subframe configured by 1 in the bitmap.

3) In order to separate the grants from each other, it may be able to differently assign an RNTI used for masking PDCCH with a CRC. In particular, an RNTI for the SA grant and an RNTI for the D2D data grant can be separately assigned to a UE. The UE considers PDCCH passing through a CRC with the RNTI corresponding to the SA grant as the SA grant and considers PDCCH passing through a CRC with the RNTI corresponding to the D2D data grant as the D2D data grant.

Meanwhile, if the specific D2D transmission UE successfully receives the grants of two types, the D2D transmission UE can transmit SA and the like to the D2D reception UE. Yet, although the specific UE has received one grant, the specific UE may fail to receive another grant. In this case, for smooth operation of the UE, it is necessary to define the operation of the UE. In the following, when the UE receives one grant only, operations of the UE are explained.

Case of Receiving One Grant Only

1) If a UE successfully receives an SA grant in a state that the UE has failed to receive an interlocked D2D data grant, the UE can transmit an NACK signal to an eNB. Having received the NACK signal, an eNB determines it as the UE has failed to successfully receive the D2D data grant and the eNB may be able to retransmit a D2D data grant to the UE. In this case, the UE can consider that the new D2D data grant corresponds to the SA grant previously used for transmitting the NACK. In this case, the UE can perform SA transmission without receiving a new SA grant. In this case, in order for the UE to transmit the NACK signal, the UE may use an ACK/NACK resource interlocked with the successfully received SA grant or a resource separately allocated in advance for a D2D-related grant.

2) If the UE receives the D2D data grant but fails to receive the SA grant interlocked with the D2D data grant, the UE can transmit an NACK signal to the eNB. Having received the NACK signal, the eNB determines it as the UE has failed to receive the SA grant and the eNB can retransmit the SA grant to the UE. If necessary, the eNB can retransmit the D2D data grant to the UE as well. In this case, in order for the UE to transmit the NACK signal, the UE may use a resource separately allocated in advance for a D2D-related grant.

Meanwhile, if the eNB receives NACK from the UE, the eNB can identify a grant related to a reception failure as follows.

The UE may use a resource allocated in advance to transmit NACK. For example, if the UE successfully receives the SA grant in a subframe n but fails to receive the D2D data grant interlocked with the SA grant, the UE can transmit NACK in a subframe n+k corresponding to a designated subframe using the allocated resource. In this case, the eNB determines it as the D2D data grant is not successfully transmitted based on a location of the subframe and the eNB can retransmit the D2D data grant only.

Or, the UE can transmit NACK based on a prescribed time window. As an example, if a value of the time window is configured by 10 ms, the UE determines whether or not there exists a D2D data grant received before and after 10 ms on the basis of timing at which an SA grant is successfully received. If the D2D data grant does not exist, the UE recognizes that reception of the D2D data grant interlocked with the SA grant has failed and the UE can transmit NACK on the timing at which the time window expires. In this case, the eNB identifies that the D2D data grant is not successfully transmitted based on the timing at which the NACK is received and the eNB can retransmit the D2D data grant only. Similarly, if an SA grant is not received within a time window on the basis of timing at which a data grant is received by the UE, it may be able to configure the UE to transmit NACK to the eNB.

Figure 10:
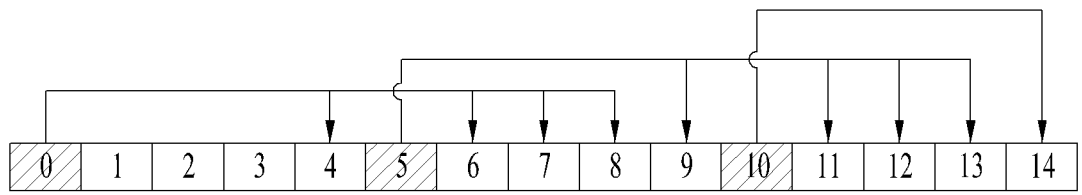
FIG. 10 is a diagram for explaining a relationship between scheduling allocation and data according to one embodiment of the present invention.

FIG. 10 is a diagram for explaining a relationship between a subframe in which SA is transmitted and a subframe in which data is transmitted. Transmission timing of the SA is explained in the following with reference to FIG. 10.

When a D2D reception UE receives SA in a specific subframe, time is taken for decoding the SA and a D2D data interlocked with the SA can be received only after the time elapsed. In particular, when a large number of SA are capable of being transmitted in a single subframe, a problem may become more serious. If a time interval as much as k ms is required between the SA and the D2D data, the D2D data interlocked with the SA, which is received in a subframe n, appears in a subframe n+k or later.

As an example, it may assume a case that a specific D2D subframe n+h exists at a subframe n and a subframe n+k and the specific D2D subframe n+h is used for D2D data. In this case, it may be able to assume that SA, which is interlocked with data transmitted in the subframe n+h, is not transmitted in the subframe n and the SA is transmitted at timing earlier than the subframe n. preferably, it may be able to assume that the SA is transmitted in a subframe n+h-k or timing earlier than the subframe n+h-k. As an example, FIG. 10 assumes that k corresponds to 4, an SA subframe periodically appears once in 5 subframes, and the remaining subframes correspond to D2D data subframes. Hence, referring to FIG. 10, for example, SA transmitted in a subframe #5 corresponds to data of subframes #9 to #13 of which time as much as 4 ms has elapsed.

A D2D transmission UE can transmit a different D2D data to each of a plurality of reception UEs. Hence, it is necessary for the D2D transmission UE to know a D2D reception UE (hereinafter, a target UE) related to a D2D grant received from an eNB. In the following, interlocking between the D2D grant and the target UE is explained.

A location of a subframe in which a D2D grant is transmitted can be used not only for the purpose mentioned earlier in the separation method 2) between grants but also for a purpose described in the following. In particular, the location of the subframe in which the D2D grant is transmitted can be used for a different purpose as well as a purpose of separating an SA grant from a data grant.

In the following, as a further different purpose, a method of configuring an interlocking relationship between a D2D grant and a D2D reception UE using the location of the subframe is explained with reference to FIG. 11.

Figure 11:
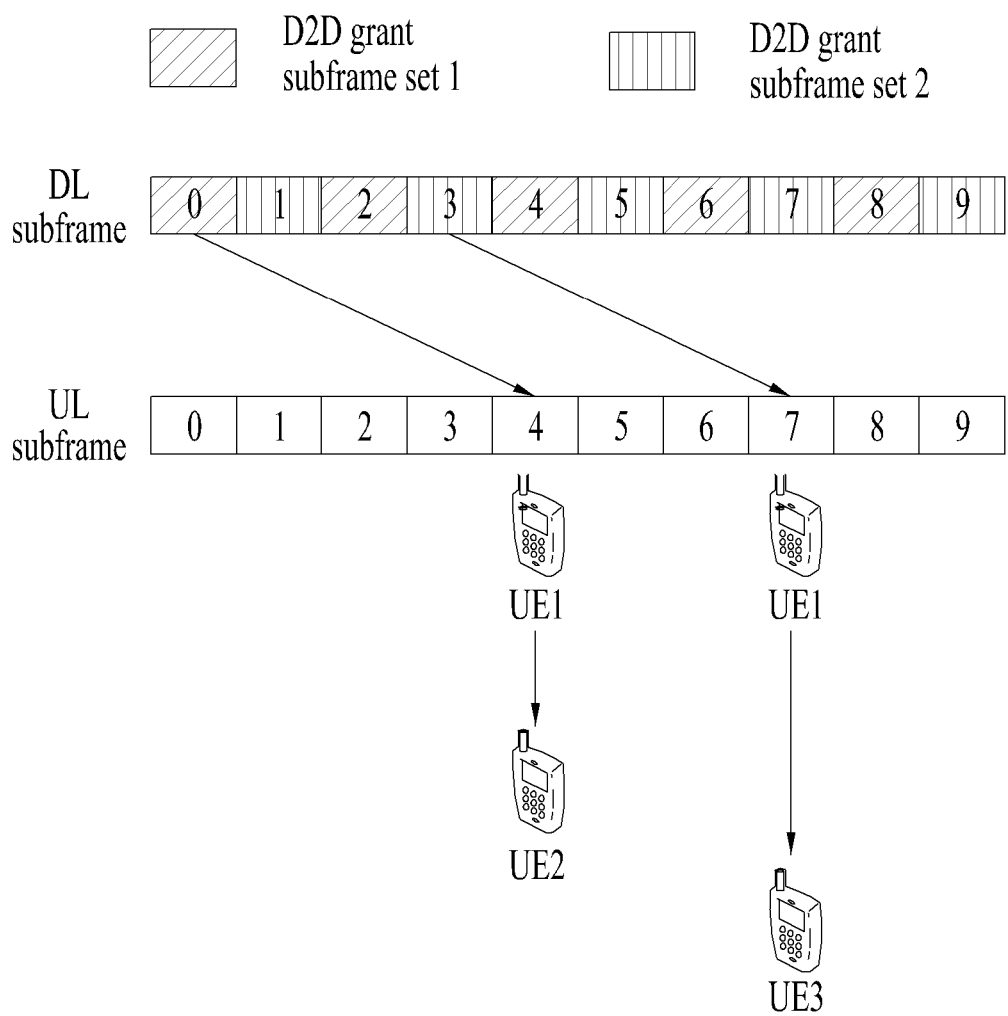
FIG. 11 is a diagram for explaining a procedure of transmitting and receiving a signal for device-to-device communication according to one embodiment of the present invention.

FIG. 11 is a diagram for explaining a procedure of transmitting and receiving a signal for device-to-device communication according to one embodiment of the present invention.

For clarity, as shown in FIG. 11, assume that a UE1 transmits a different D2D signal to each of a UE2 and a UE3 according to an indication received via a D2D grant. In this case, various information of the D2D grant indicated by an eNB may vary depending on a specific D2D reception UE (or a target UE) becoming a target of the reception. If the UE2 is located near the UE1, the amount of resources and transmit power utilized for performing transmission to the UE2 are reduced. On the contrary, if the UE3 is far from the UE1, it may use many resources. In order to provide the operation, when the UE1 receives a specific D2D grant and transmits a D2D signal by applying the D2D grant, it is necessary for the UE1 to identify a target UE to receive the D2D signal. In this case, the D2D grant can include an SA grant and a data grant.

Referring to FIG. 11, when there are a plurality of D2D reception UEs, if a D2D transmission UE transmits D2D signal using a location of a subframe in which the D2D grant is received, the D2D transmission UE can identify a UE to receive the D2D signal.

In this case, the D2D transmission UE can determine a specific reception UE based on the location of the subframe in which the D2D grant is received. As an example, the eNB informs the D2D transmission UE of a first subframe set in advance via such a higher layer signal as RRC and may be able to indicate the D2D transmission UE to utilize a D2D grant received in a subframe belonging to the first subframe set for transmitting a D2D signal to the UE2. And, the eNB informs the D2D transmission UE of a second subframe set in advance and may be able to indicate the D2D transmission UE to utilize a D2D grant received in a subframe belonging to the second subframe set for transmitting a D2D signal to the UE3. In this case, for clarity, it is assumed that there are two D2D grant subframe sets, by which the present invention may be non-limited. In particular, the number of the D2D grant subframe sets may have a bigger number depending on the number of D2D reception UEs capable of being managed at the same time.

In FIG. 11, assume that a D2D grant in a subframe n is used for transmitting a D2D signal in a subframe n+4 in a state that a subframe including an even number index is designated as a first subframe set and a subframe including an odd number index is designated as a second subframe set. Or, it may omit the aforementioned RRC signal and may be then able to simply identify a UE becoming a reception target according to a remainder resulted from dividing indexes of DL subframes by the number of reception UEs. In particular, it may be able to determine a UE becoming a reception target according to a value corresponding to (DL subframe indexes) mod (number of reception UEs). In this case, the mod corresponds to modulo calculation. For example, when a specific UE transmits a different D2D data to 4 UEs in total, if a DL subframe index n is divided by 4 and the remainder corresponds to R, a D2D grant transmitted to an $R^{th}$ reception UE in the subframe n can be utilized for transmitting a D2D signal in a subframe n+4. Or, a UE including an index or an identifier corresponding to the value of the (DL subframe indexes) mod (number of reception UEs) can be determined as a UE becoming the reception target. In this case, the index may correspond to a physical index or a logical index value.

Meanwhile, as a method of identifying a target UE, it may use RNTI. In order to identify the target UE, an eNB can differently assign RNTI for masking PDCCH with a CRC. In particular, a different RNTI can be assigned to a UE according to a D2D reception UE. The UE considers PDCCH passing through a CRC using RNTI corresponding to a specific target UE (e.g., UE 2) as a grant for the UE 2. The UE can transceive a signal with a D2D reception UE using the grant.

As mentioned in the foregoing description, since it is able to configure a relationship between a D2D grant and a D2D reception UE using a location of a subframe without adding any separate field for indicating a reception UE, it is able to reduce signaling overhead.

Figure 12:
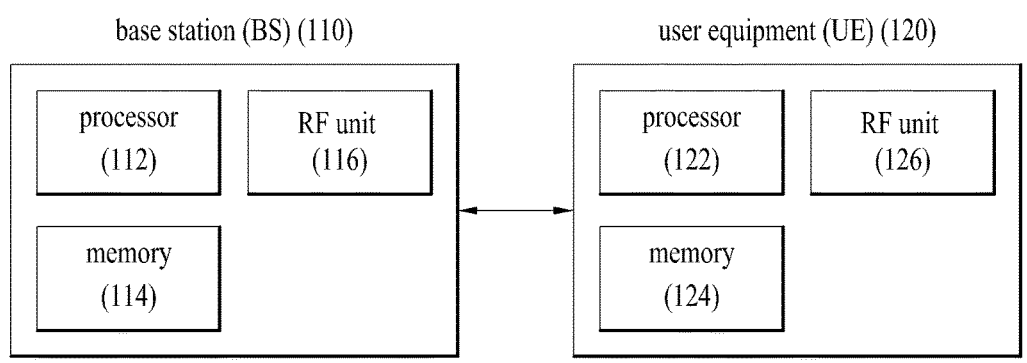
FIG. 12 is a block diagram for a transmitter and a receiver applicable to the present invention.

FIG. 12 shows examples of a base station and a user equipment applicable to embodiments of the present invention. In case of a system including a relay, the base station or the user equipment can be replaced with the relay.

Referring to FIG. 12, a wireless communication system includes a base station (BS) 110 and a user equipment (UE) 120. The base station 110 includes a processor 112, a memory 114, and a radio frequency (RF) unit 116. The processor 112 is configured to perform a procedure and/or methods proposed in the present invention. The memory 114 is connected with the processor 112 and stores various information related to the operations of the processor 112. The RF unit 116 is connected with the processor 112 and transmits and/or receives a radio signal. The user equipment 120 includes a processor 122, a memory 124, and a radio frequency (RF) unit 126. The processor 122 is configured to perform a procedure and/or methods proposed in the present invention. The memory 124 is connected with the processor 122 and stores various information related to the operations of the processor 122. The RF unit 126 is connected with the processor 122 and transmits and/or receives a radio signal. The base station 110 and/or the user equipment 120 may have a single antenna or multiple antennas.

The above-described embodiments are combinations of elements and features of the present invention in a predetermined manner. Each of the elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. In the appended claims, claims that are not explicitly dependent on each other may of course be combined to provide an embodiment or new claims can be added through amendment after the application is filed.

In the present disclosure, embodiments of the present invention are described centering on the data transmission/reception relations between a user equipment and a base station. In this disclosure, a specific operation explained as performed by a base station can be performed by an upper node of the base station in some cases. In particular, in a network constructed with a plurality of network nodes including a base station, it is apparent that various operations performed for communication with a user equipment can be performed by a base station or other network nodes except the base station. The base station may be replaced with terms such as a fixed station, Node B, eNode B (eNB), and access point. Also, the user equipment may be replaced with terms such as mobile station (MS) and mobile subscriber station (MSS).

The embodiments of the present invention may be implemented using various means. For instance, embodiments of the present invention may be implemented using hardware, firmware, software and/or any combinations thereof. In case of the implementation by hardware, one embodiment of the present invention may be implemented by one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be driven by a processor. The memory unit may be provided within or outside the processor to exchange data with the processor through the various means known to the public.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be used for a wireless communication device such as a UE, a relay, a base station, and the like.

What is claimed is:

1. A method for transmitting and receiving, by a device-to-device (D2D) transmission user equipment (UE), signals for D2D communication in a wireless communication system, the method comprising:
receiving, from a base station, a D2D data grant containing information for a first resource which is used for transmitting and receiving D2D data;
receiving, from the base station, a scheduling allocation grant for a second resource which is used for transmitting D2D scheduling allocation information;
determining a D2D reception UE corresponding to the D2D data grant among a plurality of D2D reception UEs based on an index of a subframe in which the D2D data grant is received;
transmitting the D2D scheduling allocation information to the determined D2D reception UE through the second resource, the D2D scheduling allocation information containing information for the first resource; and
transmitting D2D data to the selected D2D reception UE through the first resource,
wherein the D2D reception UE is determined among the plurality of D2D reception UEs based on a remaining value according to a modulo operation between a number of the plurality of the D2D reception UEs and the index of the subframe, and wherein the D2D data grant and the scheduling assignment grant do not include an identifier for the D2D reception UE.

2. The method of claim 1, wherein a specific field contained in the D2D data grant is interlocked with a specific field contained in the scheduling allocation grant.

3. A device-to-device (D2D) transmission user equipment (UE) for transmitting and receiving signals for D2D communication in a wireless communication system, the D2D transmission UE comprising: a transceiver configured to:

receive, from a base station, a D2D data grant containing information for a first resource which is used for transmitting and receiving D2D data, and receive, from the base station, a scheduling allocation grant for a second resource which is used for transmitting D2D scheduling allocation information; and a processor configured to:

determine a D2D reception UE corresponding to the D2D data grant among a plurality of D2D reception UEs based on an index of a subframe in which the D2D data grant is received, wherein the transceiver is further configured to:

transmit the D2D scheduling allocation information to the determined D2D reception UE through the second resource, the D2D scheduling allocation information containing information for the first resource, and transmit D2D data to the selected D2D reception UE through the first resource, wherein the D2D reception UE is determined among the plurality of D2D reception UEs based on a remaining value according to a modulo operation between a number of the plurality of the D2D reception UEs and the index of the subframe, and wherein the D2D data grant and the scheduling assignment grant do not include an identifier for the D2D reception UE.

* * * * *